United States Patent [19]
Burgess, Jr.

[11] Patent Number: 5,974,877
[45] Date of Patent: *Nov. 2, 1999

[54] SIGHT WINDOW ASSEMBLY AND METHOD OF FORMING SAME

[75] Inventor: Ralph D. Burgess, Jr., Plymouth, Minn.

[73] Assignee: Food Engineering Corporation, Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/641,541
[22] Filed: May 1, 1996
[51] Int. Cl.[6] ............................. G01F 23/02; B65D 25/54
[52] U.S. Cl. .............................. 73/323; 116/227; 220/663
[58] Field of Search .............................. 73/323, 325, 330, 73/334; 116/227, 276; 29/447, DIG. 35; 220/663; 359/810

[56] References Cited

U.S. PATENT DOCUMENTS

| | | |
|---|---|---|
| 1,331,091 | 2/1920 | Becker . |
| 1,452,507 | 4/1923 | Hervig ........................ 29/447 |
| 1,566,948 | 12/1925 | Wyatt ......................... 73/334 |
| 2,144,928 | 1/1939 | Moncrieff . |
| 2,218,722 | 10/1940 | Ross ...................... 29/DIG. 35 |
| 2,252,504 | 8/1941 | Hahn . |
| 2,419,648 | 4/1947 | Koontz . |
| 2,744,487 | 5/1956 | Moore et al. .................. 73/323 |
| 3,345,872 | 10/1967 | Meginnis . |
| 3,371,413 | 3/1968 | Rundle . |
| 3,373,610 | 3/1968 | Stieber . |
| 3,623,196 | 11/1971 | Bongenaar et al. . |
| 3,625,390 | 12/1971 | Meginnis . |
| 3,849,531 | 11/1974 | Mefferd . |
| 4,050,305 | 3/1977 | Evans et al. .................. 73/326 |
| 4,162,826 | 7/1979 | Van Der Beck et al. .......... 73/325 |
| 4,169,309 | 10/1979 | Meginnis ..................... 73/334 |
| 4,206,537 | 6/1980 | Meginnis ................... 29/DIG. 35 |
| 4,757,594 | 7/1988 | Kars et al. . |
| 5,150,636 | 9/1992 | Hill . |
| 5,299,349 | 4/1994 | Seibig . |
| 5,735,168 | 4/1998 | Harrison ...................... 73/323 |

FOREIGN PATENT DOCUMENTS

| | | | |
|---|---|---|---|
| 514133 | 10/1939 | United Kingdom ............. | 73/334 |
| 572020 | 9/1945 | United Kingdom ............. | 220/663 |

*Primary Examiner*—Diego Gutierrez
*Assistant Examiner*—Andrew Hirshfeld
*Attorney, Agent, or Firm*—Schroeder & Siegfried, P.A.

[57] ABSTRACT

A sight window assembly and a method of making same, the assembly being comprised of a windowpane panel mounted directly and under radial compression within an annular window-opening of a vessel wall panel and having cooperative annular peripheral portions which are complementary in shape to the window-opening defining portions of the wall panel, said panels having cooperative, mechanical, annular, positive interlocking elements. The method is comprised of providing the wall panel with the annular opening-defining portions, and the light-permeable windowpane panel, shaped to conform to the shape of the opening, and being slightly larger radially under predetermined equilibrium thermal conditions, and effecting a change in the equilibrium conditions to cause an increase in the radial differential of the wall panel opening and windowpane panel so as to permit the windowpane panel to be inserted within the opening in closing relation, inserting the windowpane panel in substantially such closing relation while maintaining said change in conditions, and maintaining the windowpane panel in such opening-closing position while permitting the wall panel and windowpane panel to return to a condition approaching such equilibrium conditions.

27 Claims, 2 Drawing Sheets

SIGHT WINDOW ASSEMBLY AND METHOD OF FORMING SAME

BACKGROUND OF THE INVENTION

The present invention relates to an improved sight window, designed for use in a large variety of situations. Such windows are commonly used in sidewalls of vessels to enable a workman to observe from one side of the wall, activities or conditions existing on the opposite side.

Sight windows are conventionally installed in machines and vessels by installing the window in a separate housing and, thereafter, securing the housing and its window, across the opening in the vessel sidewall, to the sidewall with studs or bolts. This is a much more expensive and less sanitary way of installing sight windows to the walls in which the sight window is needed, as compared to my invention.

The closest prior art of which I am aware is the manufacture and use, of such housings, which are bolted to such walls. The four patents issued to Charles E. Meginnis under U.S. Pat. Nos. 3,345,872; 3,625,390; 4,169,309; and 4,206,537, are representative of this known current prior art. Most, if not all, of these patents disclose and claim the mounting of a sight window, with or without one or more liners, within a separate housing, and thereafter securing such housings with the windows previously installed therein, to the surface of the vessel wall and across the sight window-opening in the wall. In each such instance, the windowpane (or lens, as used in said patents) is not in contact with the opening-defining portions of the sidewall, but instead, is mounted in spaced relation thereto upon the exterior surface of the sidewall.

BRIEF SUMMARY OF THE INVENTION

The present invention is intended to take advantage of the differential in thermal expansion/contraction of the material (preferably plastic) from which the windowpane may be formed, and the metal of which the wall, into which the sight window is to be installed, is made. Thus, I have conceived of a method in which the use of separate housings and attachment means can be eliminated from the mounting of sight windows in such walls. In doing so, I have conceived of forming a windowpane panel of a plastic material, such as polycarbonate, with annular peripheral portions which complement in detail the shape of the opening-defining portions of the window-opening in the wall panel, and having radial dimensions at ambient temperature slightly greater than the corresponding radial dimensions of the wall opening. The cross-sectional shape of such portions complement each other and fit snugly and cooperatively in sealed relation, once the windowpane panel is installed, as described hereinafter.

The installation of the windowpane panel is accomplished by first reducing the temperature thereof, through the application of dry ice thereto, to approximately −110° F. This causes the windowpane panel to shrink radially sufficiently so that it can be positioned within the window opening of the wall in the same general plane as the wall panel and in substantially closing relation to the opening, with the annular peripheral portions of the windowpane panel within and directly opposite the complementary-in-shape opening-defining portions of the wall panel. Such wall panels are generally of steel or stainless steel and thus have a lower coefficient of expansion than polycarbonate. If the metal wall panel is not cooled at the same time, an ample difference in radial dimensions results from the cooling of the windowpane panel, to enable the windowpane panel to be so inserted. By maintaining the windowpane panel in such substantially window-closing position and permitting same to increase its temperature under ambient conditions, the windowpane panel will seek to return to its original radial dimensions and will engage and interlock with the surrounding opening-defining portions of the wall. Continued warming of the windowpane panel toward its original ambient temperature will cause same to expand further and to be placed under radial compression by the time it closely approaches or reaches the equilibrium conditions which existed immediately prior to said cooling of the windowpane panel. Such radial compression effectively secures the windowpane panel directly within the wall panel in sealed, closed position relative to the window-opening in the wall panel.

Preferably, the cross-sectional shapes of the peripheral portions of the windowpane panel and the opening-defining portions of the wall panel are formed to carefully match and interlock. Preferably each of the two panels is provided with an annularly extending matching, interlocking beveled surface which extends radially inwardly from the matching inner surfaces of the wall panel and the windowpane panel. Preferably, said inner surfaces are flush with each other. Thus, such cooperating beveled surfaces constitute annular cooperating interlocking elements.

As described hereinafter, in accordance with my invention, there are various other ways in which the windowpane panel and sidewall can be treated so as to take advantage of their differences in coefficients of expansion. In each case, however, a change is effected in the predetermined equilibrium conditions, normally provided by ambient temperatures. The change must be sufficient to cause an increase in the differential of the radial dimensions of the windowpane panel and the opening-defining portions of the wall panel to permit the windowpane panel, which is slightly larger at ambient temperature, to be positioned in opening-closing position within the opening-defining portions of the wall panel. Once this is accomplished, the windowpane panel will become permanently mounted therein by merely maintaining same in that opening-closing position until the temperatures of the two panels return to that of the equilibrium conditions previously existing at ambient temperatures. This return places the windowpane panel under radial compression, which holds that panel locked in the desired position.

Wherever herein the term "light-permeable" is utilized to indicate a quality of the windowpane panel, it is intended to connote that said panel is formed of a material sufficiently penetrable by radiant energy so that the presence and certain characteristics of objects lying beyond can be ascertained from the opposite side of the material.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

My instant invention is designed to take advantage of the differentials in thermal expansion which exist in various materials usable in the manufacture of sight windows. In addition, it is designed to greatly simplify and diminish the cost of manufacturing and maintaining sight windows, compared to those constructed as heretofore known. It is designed to enable the sight window to be mounted directly into the sidewall of the vessel and thereby eliminate much of the expense of manufacture and the periodic replacement of deteriorated components such as the packing members and gaskets of the Prior Art. In addition, it is designed to provide a much simpler and more effective means of securing the windowpane panel to the vessel by installing same directly within the sidewall panel of the vessel.

Figure 1:
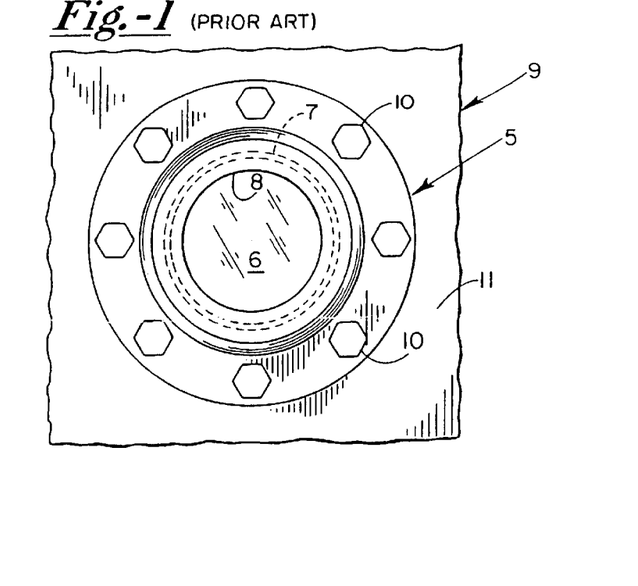
FIG. 1 is a plan view of a PRIOR ART separate housing with a sight window mounted therein, showing the means by which the separate housing is bolted over the window-opening in the sidewall of the vessel.

FIG. 1 is a plan view of the latest Prior Art sight window of which I am aware. As shown, it includes a separate annular housing 5 within which a windowpane panel is secured through the use of an annular rigid liner 7 and a deformable resilient liner 8. The two liners 7 and 8 are intended to perfect a seal and to hold the panel 6 in place. The entire housing 5 is secured to the outside of the vessel 9, by means of bolts 10, to cover the window opening in the wall 11 of the vessel. This Prior Art is explained in greater detail in the McGinnis Patent No. 4,206,537.

Figure 2:
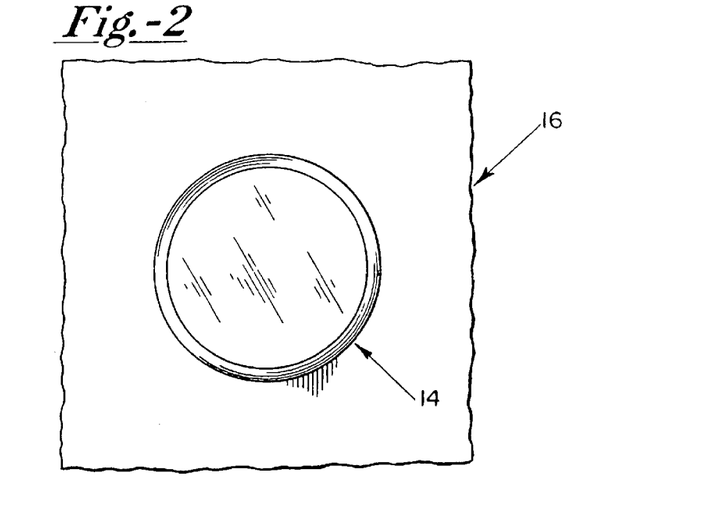
FIG. 2 is a plan view of a sight window manufactured and mounted directly within the sidewall of a vessel, in accordance with the instant invention.

FIG. 2 shows a sight window manufactured and installed in accordance with the instant invention. As shown, the windowpane panel 14 is mounted directly within the opening-defining portions 15 of the wall panel 16. As can be readily seen by reference to FIGS. 2 and 3, the windowpane panel 14 is positioned and locked directly within the opening-defining portions 15 of the vessel wall panel in the plane thereof, thereby obviating the need for a separate housing, liners, bolts, etc.

The clue to the success of my invention is that the windowpane panel secures itself directly within the opening by its inherent expansive action which results from warming thereof from a severely chilled condition to ambient temperature conditions, while maintained in coplanar position within the sight window-opening-defining portions of the wall panel. All that is required is a windowpane panel having adequate permeability of radiant energy and compressive strength, with appropriate dimensions and the proper change in the differential of equilibrium conditions affecting the wall panel and the windowpane panel, with the latter having a sufficient coefficient of expansion so that, upon adequate cooling, it will diminish radially sufficiently to permit same to be inserted within the window-opening; and upon subsequent warming, will expand into interlocked position within the beveled opening-defining portions of the vessel wall panel.

Figure 3:
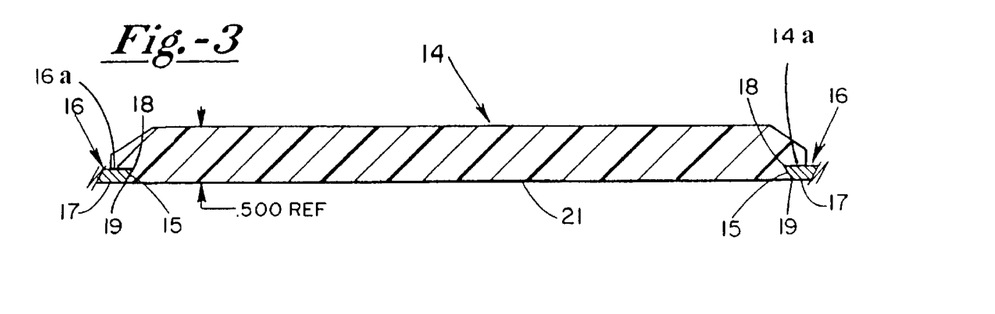
FIG. 3 is a fragmentary cross-sectional view of the sight window shown in FIG. 2, on an enlarged scale.

As shown in FIG. 3, the circular opening-defining portions 15 of the wall panel 16 are beveled so that the bevel extends outwardly from the inner surface 17 of the wall panel toward the exterior and radially inwardly thereby making the opening defining portions 15 frusto-conical in shape. Thus, the smaller end 18 of the bevel is disposed outwardly of the larger inner end 19 of the opening.

Figure 4:
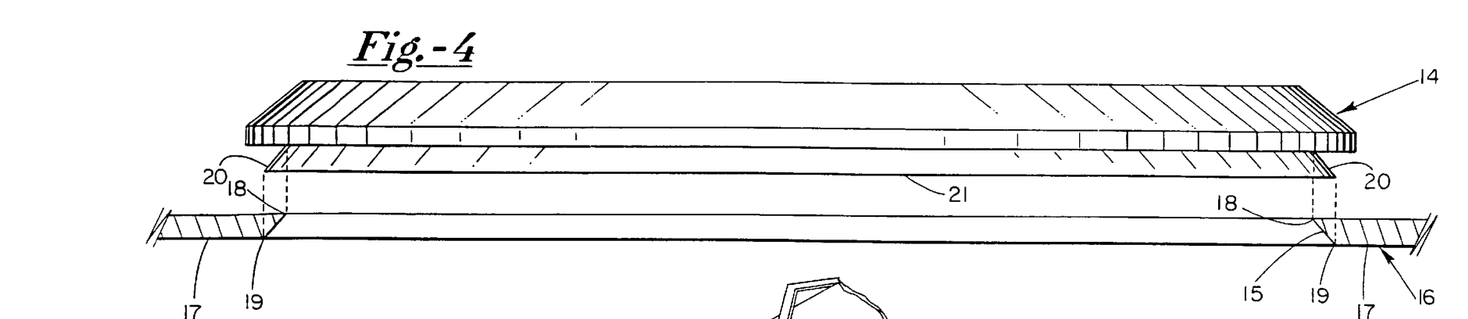
FIG. 4 is a diagrammatic sectional view of the sight window of FIG. 2, showing the polycarbonate windowpane panel and the opening-defining portions of the wall panel, positioned to illustrate the extent of shrinkage of the windowpane panel which is needed to permit its installation directly into the wall panel.
Figure 5:
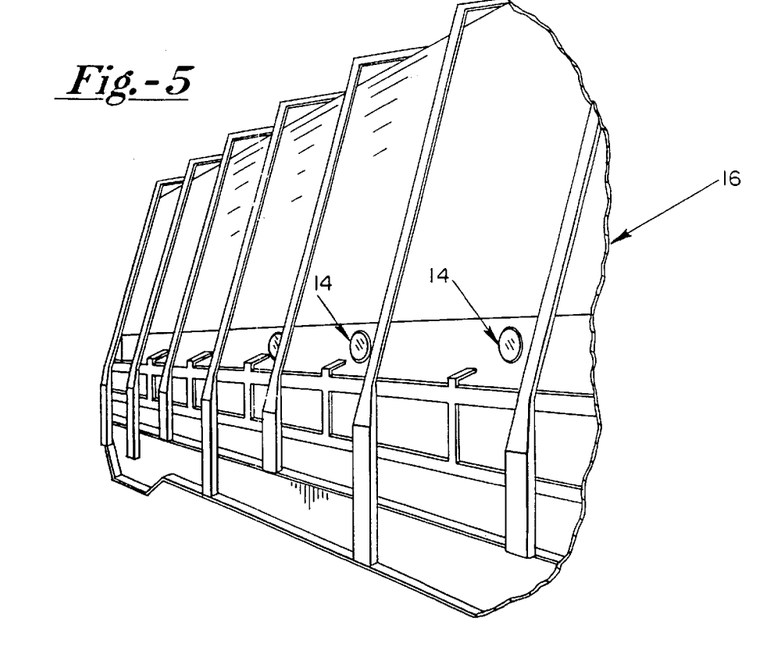
FIG. 5 is a partial elevational view of a material-containing vessel having sidewalls within which sight windows embodying my invention are installed.

It will be seen, by reference to FIGS. 3 and 4, that the axially planar non-greased peripheral portions 20 of the windowpane panel 14 are likewise beveled so as to conform in size and shape and complement the beveled annular shape of the opening-defining portions 15 of the wall panel 16, so as to have a true sealing fit therewith. The free form dimensions of the beveled surface of the windowpane panel 14 is slightly larger in its free form, as hereinafter described, than the opening-defining portions 15 and, consequently, the panel 14, when installed, is under radial compression, as also described hereinafter.

As best seen in FIG. 3, the beveled surface of the windowpane panel 14 and the complementary beveled surface of the wall panel 16 interengage and positively interlock, so that the panel 14 is locked securely in place against the panel 14 being ejected from the window-opening of the wall panel 17.

It will also be seen, by reference to FIG. 3, that the inner surface 17 of the wall panel is substantially flush with the inner surface 21 of the windowpane panel 14, while the outermore peripheral portions 14a of the windowpane panel 14 bear against the exterior surface 16a of the wall panel 16, to complete the locking function.

To prepare and install a windowpane panel 14, such as is shown in FIG. 3, one must prepare an opening, preferably circular, in a wall panel such as is shown in FIGS. 2–5, having opening-defining portions 15 defining said opening. The beveled surface defined between the ends 18 and 19 is cut at a preferred angle, depending upon the diameter of the opening. The angle shown in FIG. 3 is at 10°, for a six-inch opening.

A windowpane panel 14 is then prepared of a material having a suitable coefficient of expansion, as described hereinafter, and having peripheral portions of the same shape as the bevel of the opening-defining portions. The beveled surface of the windowpane panel 14, however, is slightly larger in diameter, in its free form at ambient temperature, than the beveled surface of the opening of wall panel 16, so that when panel 14 has been installed within the opening-defining portions 15 of said wall panel, it will be under radial compression. The windowpane panel 14 should be constructed of a material which is preferably at least translucent to visible light, but in any event, is light permeable, as defined elsewhere herein. It should also have an adequate coefficient of expansion sufficient to alter the differential in predetermined equilibrium conditions adequately to cause the panel 14 to contract enough to permit the panel 14 to be inserted in substantially planar relation within the opening-defining portions 15 of the wall panel 16. The windowpane panel 14, as shown, is six (6) inches in diameter, is comprised of polycarbonate which has a coefficient of expansion of $3.89 \times 10^{-5}$ in./in./°F. It has a compressive strength in excess of 11,000 p.s.i.

To determine the size to which the windowpane panel 14, particularly its beveled surface, should be made, I first determine the total amount of contraction which is needed to permit said panel to be inserted in planar relation within the opening-defining portion 15 of the wall panel 16. I accomplish this either by measuring or calculating the radial distance between the end 18 and the end 19 of the bevel of the opening-defining portions 15. I then, knowing the approximate temperature (−110° F.) to which I choose to cause the windowpane panel to contract, insert such values in the formula for determining contraction, as shown below.

Diameter or length of specimen×3.89×10$^{-5}$ in./in./°F.×[75° F.−(−110° F.)]=contraction
where −110° F. is the temperature to which I intend to cool the polycarbonate and 3.89×10$^{-5}$ in./in./°F. is the coefficient of expansion of polycarbonate. These calculations or measurements yielded a required contraction value of approximately 0.043 inches for a 6-inch diameter window. With that information in hand, I determine the diametrical size of the beveled surface of the windowpane panel 14 which would contract to a slightly greater extent than the opening and yet will expand, upon warming to ambient temperature, to firmly lock that panel 14 in a sealed, mechanically and positively locked relation within the wall panel 16. I selected an interference diameter of 6.0051″ for the windowpane panel 14, which contracts sufficiently at −110° F. to enable me to insert same in planar relation within the 6.0001″ circular opening in the wall panel 16, and will expand sufficiently upon return to ambient temperature to lock same within that opening.

When I have prepared the windowpane panel to the so-indicated size, which will be slightly larger than the opening-defining portions 15, I merely subject same to contact with dry ice to reduce its temperature to −110° F., at which I insert same into the opening-defining portions 15 in planar relation thereto, and permit the windowpane panel to warm, and consequently expand into interlocking relation with the opening-defining portions, as shown in FIG. 3.

Before installing the windowpane panel, as described above, I check the compressive stress on the polycarbonate panel by utilizing the formula outlined below:

$$\frac{\text{Amount of contraction needed}}{\text{Total length (diameter)}} \times 3.2 \times 10^5 \text{ p.s.i} = \text{compressive stress}$$

The above indicated calculations yielded a compressive stress value of approximately 250–300 p.s.i., which is well below the compressive strength of polycarbonate (11,000 p.s.i.). Consequently, polycarbonate is a material well adapted for use in practicing the instant invention. Moreover, when I calculated its compressive stress, with its temperature raised to 130° F., the compressive stress was slightly less than 1,000 p.s.i. From this, it can be seen that polycarbonate is well-suited for use in practicing my invention. The value of 3.2×10$^5$ p.s.i. utilized above is known as Young's Modulus, which is the modulus of elasticity for polycarbonate.

It should be recognized that, as the size of the window-opening in the vessel increases, the angle of the bevel can also be increased, for a given wall thickness, because the formula for calculating contraction always produces greater contraction for larger sized openings. The larger the angle of the bevel, the greater is the holding strength provided thereby. Consequently, for larger window-openings, the beveled surfaces should be formed at greater angles.

I have noted that many plastics are suitable for use from which to form windowpane panels in practicing my invention. Glass, however, is a relatively poor material for this purpose, because the coefficient of expansion is relatively low. Most plastics have comparable coefficients of expansion. Glass could be used as a windowpane panel, if the wall panel is made of plastic, in which case the plastic wall would be heated to expand it sufficiently so that it can be shrunk onto the glass. The latter, of course, could more easily be fractured.

It should be noted that my above invention can be practiced in a number of different manners. The critical essential is that a change must be made in the predetermined equilibrium conditions of the slightly larger windowpane panel 14 and the opening-defining portions of the wall panel to cause a dimensional change between the windowpane panel and opening-defining portions of the wall panel sufficient to permit the insertion of the windowpane panel into the opening-defining portions of the wall panel in substantially planar relation with their respective bevels in juxtaposition so that they will cooperatively interlock upon said change being removed. The above manner of calculating the required diameter for windowpane panels can be followed for other sized panels, as described hereinbelow.

It will be readily appreciated that various sizes of sight windows may be considered desirable and that the amount of interference needed between the windowpane panel and wall panel opening dimensions will necessarily vary accordingly. Thus, windows having a larger diameter will necessarily require a bevel having a greater angle in order to insure retention of the windowpane panel therewithin. The greater bevel angle will provide a greater radial distance between the ends of 18 and 19 of the beveled surface.

When this greater distance is increased slightly, as in my earlier example using a 6-inch windowpane panel, and plugged into the above formula for measuring contraction, a greater calculated required diameter will be obtained. Following the same procedure as outlined above for the six (6) inch diameter windowpane panel, the compressive stress within a larger polycarbonate windowpane panel can also be calculated in a similar manner to insure that it is well within the acceptable range of compressibility for polycarbonate.

The preferred manner of practicing my invention is the example of polycarbonate, as described hereinbefore. The same results, however, can be accomplished in a different, but related, manner by heating the stainless steel wall panel, in addition to cooling the material from which the windowpane panel is formed. Another slightly different manner of practicing my invention would be to both cool the windowpane panel and heat the wall panel opening-defining portions.

Another manner of practicing my invention can be effected by heating both the panels 14 and 16 to widely different degrees to produce the desired temperature differential. Still another manner of practicing my invention can involve cooling both of the panels 14 and 16, but to a widely different degree so as to produce the desired temperature differential.

A further manner of practicing my invention would be to form the wall panel and windowpane panel of materials having the same coefficients of expansion, but heating or cooling one or the other sufficiently to create the desired temperature differential.

In each of the above manners, upon return to equilibrium conditions such as at ambient temperatures, the windowpane panel 14 will be firmly interlocked in substantially planar relation within the wall panel. The crucial features are that the peripheral portions of the windowpane panel in each instance be of slightly greater size than the opening-defining portions of the wall panel at equilibrium conditions, and become sufficiently lesser in size, as a result of the change in said conditions to permit same to be inserted in the wall panel opening, and become secured directly within said opening-defining portions under radial compression, as a result of return to said equilibrium conditions.

While I prefer to utilize polycarbonate as the material from which I form sight windows in accordance with my invention, other plastics may be used. Thus, it appears that polysulfone, polystyrene, and acrylic also function satisfactorily. Most plastics have coefficients of expansion which are in the general range suitable for use, but not all permit passage of light therethrough as easily as others. Each of the above four plastics have coefficients of expansion with the range of $3.1 \times 10^{-5}$ to $3.9 \times 10^{-5}$ in./in./°F. and readily permit the passage of visible light therethrough.

Wherever herein I have used the term "windowpane panel," it is intended to connote a panel which is "light permeable," as defined herein, and is shaped to conform to the shape of the window-defining portions of the wall panel into which it is to be mounted, and in its free form is slightly larger than said opening, as so defined by said opening-defining portions, to cause same to be subjected to and maintained under radial compression, upon returning to equilibrium conditions.

Wherever herein I have utilized the term "complementary" as to shape, it is intended to connote a shape which is the reverse of the shape to which reference is made, so that the two beveled shapes will fit tightly together in matching relation as one, while conforming to the other in a tight compression fit, with no space therebetween along their entire joined surfaces.

Wherever herein I have utilized the term "annular," it is intended to connote a closed or continuous surface, not necessarily, but preferably, circular in shape, which surrounds an opening.

Wherever herein I have utilized the term "change in radial difference," it is intended to connote a change in dimensions of either the windowpane panel or the wall panel, or both.

If the above instructions are carefully followed, sight windows which are much less expensive to manufacture and utilize can be obtained. Less time and fewer materials are required to design and manufacture them. They may be utilized to enable a work supervisor to view products inside the vessel, in the sidewalls of which such windows are installed, to view products, or to see how machinery within the vessel is functioning, or to provide windows for photo-eyes, or to view product fill locations within a bin.

One use of these improved sight windows is to install them in pairs on opposite sides of a bin, or other vessel, with a light-emitting transmitter outside of one of the windows and a receiver at the other window.

Another use for these windows is with capacitance-type sensors which utilize a single window through which an energy field is transmitted. Such a sensor can detect whether a solid or liquid object comes within certain proximity of its energy field.

Various types of sealant may be applied to the peripheral portions of the windowpane panel, or to the opening-defining portions of the wall panel, just prior to installation of the windowpane panel, to provide a liquid-tight installation in the wall panel.

Since the coefficient of expansion of steel is $6.5 \times 10^{-6}$ in./in./°F. and that of stainless steel is $9.6 \times 10^{-6}$ in./in./°F., and since the coefficient of expansion of polycarbonate is $3.89 \times 10^{-5}$ in./in./°F., there is a relatively wide differential therebetween and, hence, the polycarbonate functions well as a windowpane panel because of its relatively high thermal expansion/contraction. For that reason, the combination of a stainless steel wall panel and a polycarbonate windowpane panel is preferred.

It will, of course, be understood that various changes may be made in the form, details, arrangement and proportions of the parts without departing from the scope of the invention which comprises the matter shown and described herein and set forth in the appended claims.

I claim:
1. A method of forming a sight window comprising:
   a. providing a vessel wall panel having an outer surface and opening-defining portions defining an annular window-opening therein, said opening-defining portions being beveled to form a smaller end at the outer surface;
   b. providing a light-permeable plastic windowpane panel, having an inner surface and having a frusto-conical window-opening-engaging surface surrounding its perimeter and engaging and portions extending around its conforming in shape to said opening-defining portions of said wall panel and having peripheral collar portions larger in radius tan said opening and disposed adjacent to and outwardly of said conforming surface, said collar portions and said conforming surface being at an acute angle relative to each other to form a cavity for receiving said smaller end;
   c. the radial dimensions of said conforming surface being only slightly larger under predetermined equilibrium conditions than said opening;
   d. effecting a change in said predetermined equilibrium conditions of said windowpane panel and said opening-defining portions of said wall panel sufficient to cause an increase in the radial differential of said windowpane panel and said wall panel opening-defining portions so as to permit said windowpane panel to be inserted in opening-closing position within said opening-defining portions of said wall panel;
   e. inserting said windowpane panel, while maintaining said change in conditions, directly within the plane of said wall panel opening in substantially opening-losing position with said conforming surface of said windowpane panel in complementary shape juxtaposition with said opening-defining portions of said wall panel and said larger peripheral collar portions bearing against the outer surface of said wall panel around said opening, and
   f. maintaining said windowpane panel so inserted within said opening-defining portions of said wall panel in such substantially opening-closing position, while permitting said opening-defining portions and said windowpane panel to return to a condition approaching said equilibrium conditions, whereby said opening-defining portions of said wall panel will engage and fixedly secure said conforming surface said windowpane panel within said opening-defining portions of said wall panel and thereby place and maintain said windowpane panel under radial compression.

2. The method defined in claim 1, wherein said windowpane panel is selected of a material having a coefficient of expansion sufficient to cause the radial dimensions of same to lower sufficiently, upon cooling thereof, to permit same to be inserted within said window-opening.

3. The method defined in claim 1, wherein the materials of which said wall panel and said windowpane panel are comprised of, have different coefficients of thermal expansion.

4. The method defined in claim 1, wherein the effecting of the change in said equilibrium conditions consists of effecting a temperature differential between said windowpane panel and said opening-defining portions of said wall panel.

5. The method defined in claim 4, wherein the effecting of the change in said predetermined equilibrium conditions consists of cooling said windowpane panel conforming surface to a predetermined lowered temperature.

6. The method defined in claim 4, wherein the effecting of the change in said equilibrium conditions consists of heating said opening-defining portions of said wall panel to increase their size sufficiently to permit said windowpane panel to be so inserted, in said opening-closing position, within said opening-defining portions.

7. The method defined in claim 4, wherein the effecting of the change in said predetermined equilibrium conditions consists of cooling said windowpane panel conforming surface to a reduced temperature and heating said opening-defining portions of said wall panel to an elevated temperature.

8. The method defined in claim 4, wherein the effecting of the change in said equilibrium conditions consists of cooling said windowpane panel and said wall panel to reduced temperature.

9. The method defined in claim 4, wherein the effecting of the change in said equilibrium conditions consists of heating said windowpane panel conforming surface and said wall panel to different elevated temperatures.

10. The method defined in claim 1, wherein said wall panel and said windowpane panel are comprised of materials having the same coefficients of thermal expansion.

11. A method of forming a sight window comprising:
   a. providing a vessel wall panel having opening-defining portions defining a frusto-conical annular window-opening therein and an outer surface;
   b. providing a light-permeable plastic windowpane panel, having an inner surface and having a frusto-conical window-opening-engaging surface surrounding its perimeter and engaging and conforming in shape to said opening-defining portions of said wall panel and having peripheral collar portions larger in radius than said opening and disposed adjacent said conforming surface, said collar portions and said conforming surface engaging each other at an acute angle;
   c. the radial dimensions of said conforming surface being only slightly larger under predetermined equilibrium conditions than said opening;
   d. said opening-defining portions of said wall panel and said windowpane panel having complementary, inter-engaging, cooperative, positive-locking elements;
   e. effecting a change in said predetermined equilibrium conditions of said windowpane panel and said opening-defining portions of said wall panel sufficient to cause an increase in the radial differential of said windowpane panel and said wall panel opening-defining portions so as to permit said windowpane panel to be inserted in opening-closing position within said opening-defining portions of said wall panel;
   f. inserting said windowpane panel, while maintaining said change in conditions, directly within the plane of said wall panel opening in substantially opening-closing position with said conforming surface of said windowpane panel in complementary shape juxtaposition with said opening-defining portions of said wall panel and said larger peripheral collar portions bearing against the outer surface of said wall panel around said opening and the inner surface of said windowpane panel extending flush with the inner surface of said wall panel, and
   g. maintaining said windowpane panel, as so inserted within said opening-defining portions of said wall panel, in such substantially opening-closing position, while permitting said opening-defining portions and said windowpane panel to return to a condition approaching said equilibrium conditions, whereby said opening-defining portions of said wall panel will engage and fixedly secure said conforming surface of said windowpane panel within said opening-defining portions of said wall panel and thereby place and maintain said windowpane panel under radial compression.

12. The method defined in claim 11, wherein the materials of which said wall panel and said windowpane panel are selected to have different coefficients of thermal expansion.

13. The method defined in claim 11, wherein said windowpane panel is formed of a material having a coefficient of thermal expansion sufficient to cause the radial dimensions of same to lower sufficiently, upon cooling thereof, to permit the same to be inserted within said opening-defining portions while the opening-defining portions are at said equilibrium conditions.

14. The method defined in claim 11, wherein the effecting of the change in said predetermined equilibrium conditions consists of cooling said windowpane panel conforming surface to a predetermined lowered temperature.

15. The method defined in claim 11, wherein the effecting of the change in said equilibrium conditions consists of effecting a temperature differential between said windowpane panel and said opening-defining portions of said wall panel.

16. The method defined in claim 11, wherein the effecting of the change in said equilibrium conditions consists of heating the opening-defining portions of said wall panel to increase their size sufficiently to permit said windowpane panel to be so inserted, in opening-closing position, within said opening-defining portions.

17. The method defined in claim 11, wherein the effecting of the change in said predetermined equilibrium conditions consists of cooling said windowpane panel to a reduced temperature and heating of said opening-defining portions of said wall panel to an elevated temperature.

18. The method defined in claim 11, wherein the effecting of the change in said equilibrium conditions consists of cooling said windowpane panel and said wall panel to different reduced temperatures.

19. The method defined in claim 11, wherein the effecting of the change in said equilibrium conditions consists of heating said windowpane panel conforming surface and said wall panel to different elevated temperatures.

20. The method defined in claim 11, wherein the said wall panel and said windowpane panel are comprised of materials having the same coefficients of thermal expansion.

21. A sight window within the plane of a vessel wall comprising;
   a. a vessel wall panel consisting of rigid material having a predetermined coefficient of thermal expansion and having annular opening-defining portions defining a frusto-conical window opening therein and having an outer surface extending around said opening;
   b. a rigid windowpane panel formed of light-permeable material and having surface and having a frusto-conical window-opening-engaging surface surrounding its perimeter and engaging and conforming in shape to said opening-defining portions of said wall panel, and having peripheral collar portions substantially larger in radius than said opening and disposed adjacent to and outwardly of said conforming surface and said conforming surface having slightly greater radial dimensions in its free form relative to said opening-defining portions of said wall panel, said collar portions and said conforming surface engaging each other at an acute angle;

c. said windowpane panel being mounted in interengaging relation directly within the plane of said opening-defining portions of said wall panel wherein said windowpane panel is of a size that it can only be inserted into said window-opening when, by heating or cooling, thermal expansion or contraction is utilized to change the dimensions of at least one of the wall panels and the windowpane panel; and d. said windowpane panel when so mounted being under radial compression and said peripheral collar portions bearing against said outer surface of said wall panel.

22. The sight window defined in claim 21, wherein said windowpane panel has a greater coefficient of thermal expansion than said wall panel.

23. The sight window defined in claim 21 wherein said windowpane panel is disposed under approximately 250–1000 p.s.i. of radial compression.

24. The sight window defined in claim 21 wherein said windowpane panel is comprised of polycarbonate.

25. The sight window defined in claim 21 wherein said windowpane panel is comprised of a material which has compressive strength in excess of 11,000 p.s.i.

26. The sight window defined in claim 21, wherein said opening-defining portions of said wall panel and said windowpane panel having matching, interlocking surfaces.

27. A method of forming a sight window comprising:

a. providing a vessel wall panel having an outer surface and opening-defining portions defining an annular window-opening therein, said opening-defining portions being developed to form a smaller end at the outer surface;

b. providing a light-permeable plastic windowpane panel, having an inner surface and having a window-opening-engaging surface surrounding its perimeter an engaging and conforming in shape to said opening-defining portions of said wall panel and having peripheral collar portions larger in radius than said opening and disposed adjacent to and outwardly of said conforming surface, said collar portions and said conforming surface being at an acute angle relative to each other to form a cavity for receiving said smaller end;

c. the radial dimensions of said conforming surface being only slightly larger under predetermined equilibrium conditions than said opening;

d. effecting a change in said predetermined equilibrium conditions of said windowpane panel and said opening-defining portions of said wall panel sufficient to cause an increase in the radial differential of said windowpane panel and said wall panel opening-defining portions so as to permit said windowpane panel to be inserted in opening-closing position within said opening-defining portions of said wall panel;

e. inserting said windowpane panel, while maintaining said change in conditions, directly within the plane of said wall panel opening in substantially opening-closing position with said conforming surface of said windowpane panel in complementary shape juxtaposition with said opening-defining portions of said wall panel and said larger peripheral collar portions bearing against the outer surface of said wall panel around said opening, and f. maintaining said windowpane panel so inserted within said opening-defining portions of said wall panel in such substantially opening-closing position, while permitting said opening-defining portions and said windowpane panel to return to a condition approaching said equilibrium conditions, whereby said opening-defining portions of said wall panel will lockably engage and fixedly secure said conforming surface of said windowpane panel within said opening-defining portions of said wall panel and thereby place and maintain said windowpane pane under radial compression.

* * * * *

UNITED STATES PATENT AND TRADEMARK OFFICE
CERTIFICATE OF CORRECTION

PATENT NO. : 5,974,877
DATED : November 2, 1999
INVENTOR(S) : Ralph D. Burgess, Jr.

It is certified that error appears in the above-identified patent and that said Letters Patent is hereby corrected as shown below:

Column 4, line 5, delete "non-greased" and insert --non-grooved--.

Column 5, line 14, delete "6.0051" and insert --6.005--.

Column 5, line 16, delete "6.0001" and insert --6.000--.

Claim 1, para. (b), lines 4-5, after "engaging and" delete "portions extending around its".

Claim 1, para. (b), line 7. delete "tan" and insert --than--.

Claim 1, para. (e), line 3, delete "opening-losing" and insert --opening-closing--.

Claim 1, para. (f), line 8, after "surface" insert --of--.

Claim 8, line 4, delete "temperature" and insert --temperatures--.

Claim 12, line 3, after "selected" delete "to".

Claim 17, line 3, after "panel" insert --conforming surface--.

Claim 21, para. (b), line 1, after "having" insert --and inner--

Claim 27, para. (b), line 3, after "perimeter" delete "an" and insert-- and--

Signed and Sealed this

Twenty-fourth Day of October, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,974,877  
DATED : November 2, 1999  
INVENTOR(S) : Ralph D. Burgess, Jr.

Page 1 of 1

It is certified that error appears in the above-identified patent and that said Letters Patent is hereby corrected as shown below:

<u>Column 10,</u>  
Line 56, after "having" insert -- an inner --.

Signed and Sealed this

Third Day of December, 2002

JAMES E. ROGAN  
*Director of the United States Patent and Trademark Office*